Oct. 22, 1929.    W. REYNOLDS    1,732,616
APPARATUS AND METHOD FOR MOLDING PIPE
Filed Dec. 17, 1927    5 Sheets-Sheet 1
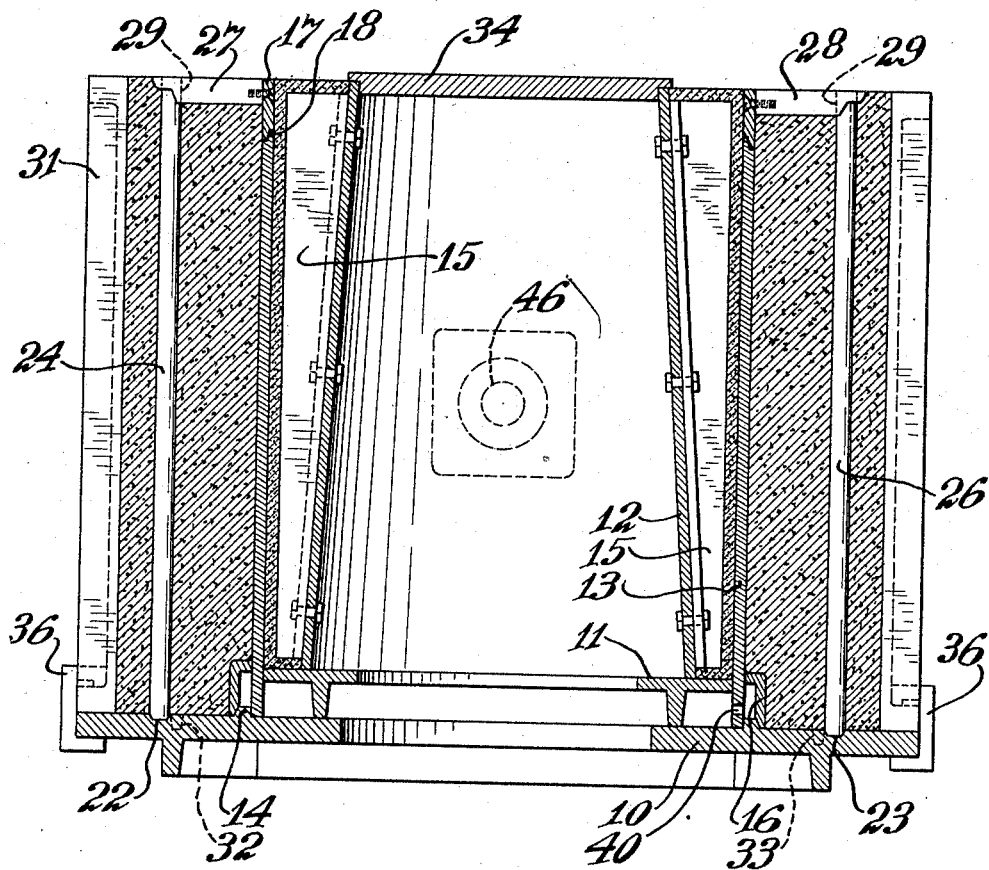
Fig.1
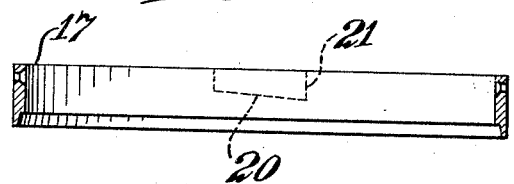
Fig.4
Inventor
Walker Reynolds
By 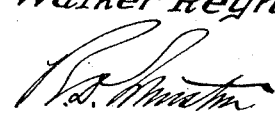
Attorney Oct. 22, 1929.   W. REYNOLDS   1,732,616
APPARATUS AND METHOD FOR MOLDING PIPE
Filed Dec. 17, 1927   5 Sheets-Sheet 2

Inventor
Walker Reynolds
By
Attorney

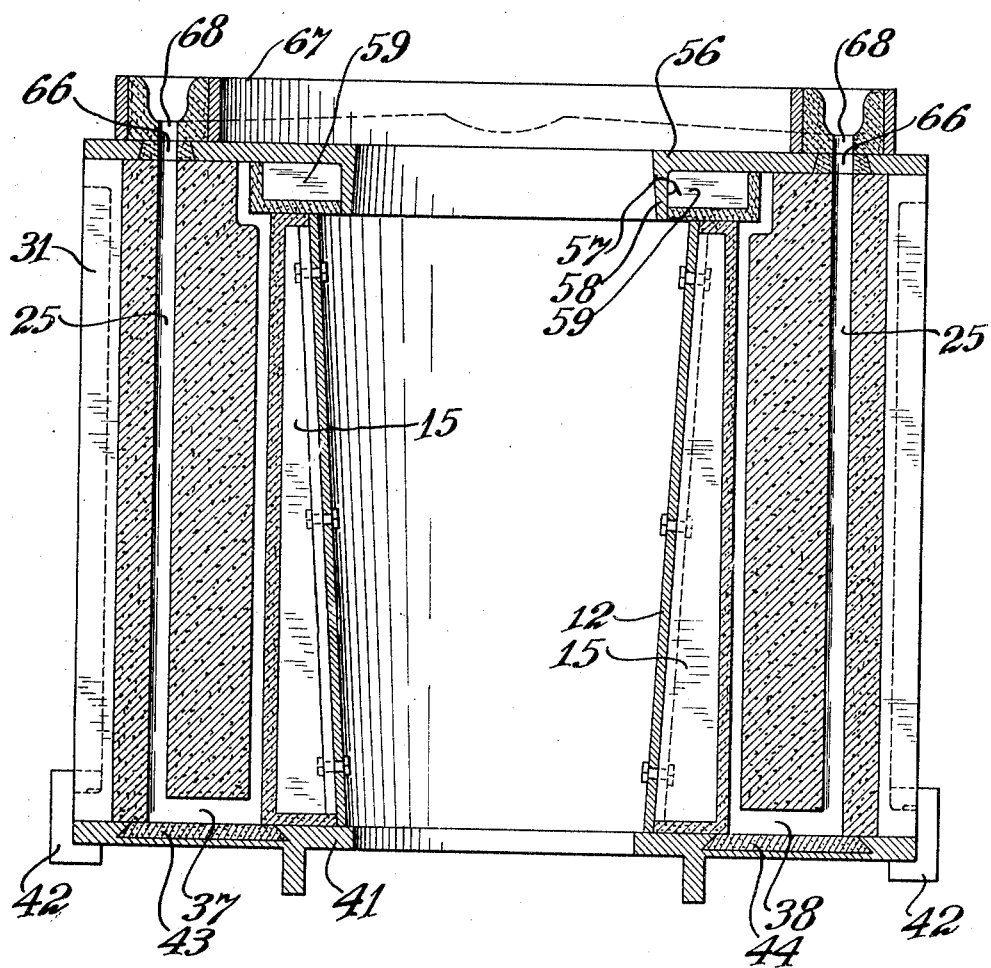

Inventor
Walker Reynolds
By
Attorney

Oct. 22, 1929.  W. REYNOLDS  1,732,616
APPARATUS AND METHOD FOR MOLDING PIPE
Filed Dec. 17, 1927  5 Sheets-Sheet 5

Inventor
Walker Reynolds
By
Attorney

Patented Oct. 22, 1929

1,732,616

UNITED STATES PATENT OFFICE

WALKER REYNOLDS, OF ANNISTON, ALABAMA, ASSIGNOR TO ALABAMA PIPE COMPANY, A CORPORATION OF ALABAMA

APPARATUS AND METHOD FOR MOLDING PIPE

Application filed December 17, 1927. Serial No. 240,873.

My invention relates to apparatus and method for molding pipe, more particularly for molding full round pipe having bell and spigot ends, and has for its object the provision of apparatus and of a method of the character designated which shall be effective to produce an unusually smooth uniform casting with a minimum of labor and expense.

A further object of my invention is to provide apparatus for molding full round pipe having bell and spigot ends wherein the sand core and outer walls of the mold are rammed in one operation.

As is well understood in the art to which my invention relates, difficulties have been encountered in providing a mold for full round pipe wherein the inner and outer surfaces of the mold could be formed in one operation. It has heretofore been the practice to form the outer surface of the mold in one ramming operation, to form the core in a separate operation, to finish the core in another operation and finally to insert the core in the mold in a still further operation. In inserting the core in the mold, especially in a mold for pipe of large diameter, it is very difficult to avoid striking or rubbing the core against the sides of the mold and forming rough spots in the mold, which rough spots, of course, appear in the finished casting marring its appearance and impairing its usefulness.

These and other difficulties are overcome by the apparatus and method of my invention and a mold is produced in a minimum of operations with the core and outer wall of the mold formed simultaneously, thus providing smooth surfaces and a mold of uniform thickness throughout. Furthermore, I provide means whereby the end surfaces of the pipe are formed on a chill plate thus giving a much smoother appearance to the ends of the pipe, than is possible where the end surfaces are formed against a sand mold. In carrying out my invention, I provide a ramming plate, and place a stripping plate and core arbor on the ramming plate, in the order named, and place the pipe pattern and the bell end pattern thereon, over the arbor and stripping plate. The spigot end of the pattern is formed by a separate ring to which are attached locking lug forms and guide strips for gate pins. The stripping plate fits snugly within the inner diameter of the pattern. A flask is next lowered over the pattern and gate pins are placed in position in the flask. The sand is next introduced in the flask and the mold is packed inside and out of the pattern by jolt ramming. After the mold has been rammed the separable spigot end pattern is removed, a spigot chill plate is secured to the flask, and the flask is reversed leaving the ramming plate on the jolter. The stripping plate and bottom plate for the flask and arbor are next securely anchored together and the pattern and bell pattern and gate pins are drawn from the mold. Suitable holes are provided in the side of the pipe pattern in order to withdraw it from the mold with a three point lift. The stripping plate is next removed and a chill plate cover, having a green sand core which forms the inside of the bell and locking lugs is placed on top of the mold and clamped to the flask. In order to provide ready locking together of the pipe sections, suitable lugs, as above described, are provided on the outside of the spigot end and cooperating lugs on the inside of the bell end. When the operations described have been completed, the molten metal is poured into the mold through the gates and the casting completed.

Apparatus embodying features of my invention is illustrated in the accompanying drawings forming a part of this application, wherein Fig. 1 is a vertical sectional view through the molding flask with the main pattern and outer bell end pattern in position for ramming;

Fig. 3 is a view similar to Fig. 2 showing the pattern stripped from the mold with the bell and cores and chill plate in place, and the mold ready for pouring;

Fig. 4 is a detail sectional view of the spigot end pattern, showing the means for forming lugs on the spigot end of the finished pipe;

Figure 2:
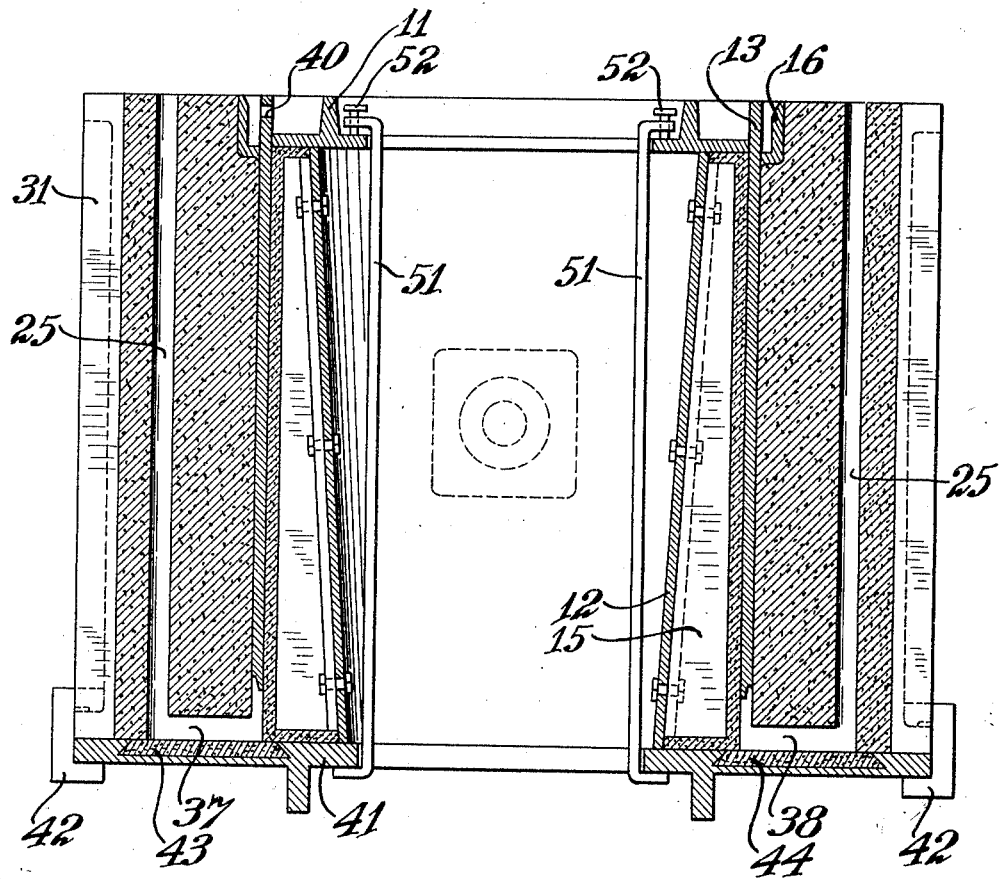
Fig. 2 is a view similar to Fig. 1 but showing the flask reversed after ramming and with the ramming plate removed, the pattern being ready to be stripped.

Referring now to the drawings, particularly to Figs. 1 to 3, I show a ramming plate 10 upon which I first mount a stripping plate 11, and over the stripping plate is placed a core arbor 12, the latter being centrally disposed with respect to the stripping plate. The core arbor 12 is frusto-conical in shape, the better to adapt it to the ramming operation, to be described later, and is provided with a plurality of radial wings 15 to aid in supporting the sand. A main pipe pattern 13 is next placed over the core arbor on the ramming plate 10 and fitting snugly about the stripping plate 11, the stripping plate and main pattern being positioned on the ramming plate 10 by means of an annular ridge 14. Over the main pattern 13 is then placed a bell end pattern 16 which fits snugly around the outer perimeter of the annular ridge 14. At the upper end of the pattern 13 is then placed a spigot end pattern 17, the inner end of the spigot end pattern 17 and the upper end of the pattern 13 being formed to provide an interlocking joint as at 18. The spigot end pattern 17 is provided, on its outer surface, with equally spaced lugs 21, only one of which is shown, and which form patterns for locking lugs on the spigot end of the finished pipe. Each of the lugs 21 has its inner surface inclined as shown at 20, in Fig. 4, to the long axis of the pipe to engage a similar surface on lugs formed on the bell end of the pipe to lock the joints together.

The ramming plate 10 is provided with suitable depressions 22 and 23 to position gate pins 24 and 26 which latter, after the mold is racked, are withdrawn to form gates 25 for pouring the mold. The gate pins 24 and 26 are positioned at the upper end of the flask, as seen in Fig. 1, by gate runners 27 and 28 secured to the spigot end pattern and provided with holes 29 for entry of the gate pins.

When the parts have been assembled, as has just been described, a flask 31 is lowered unto the ramming plate around the pattern and is positioned on the ramming plate 10 by means of dowels 32 and 33 suitably spaced about the flask and fitting in complementary depressions in the ramming plate. A cover 34 is then placed over the arbor 12 and sand is packed into the flask both on the inside and outside of the pattern so as to form both the core and the outer surface of the pipe mold. In order to carry out this part of the process the flask 31 is clamped to the ramming plate 10 by C clamps 36, and the packing of the mold may then be accomplished by jolt ramming.

Figure 10:
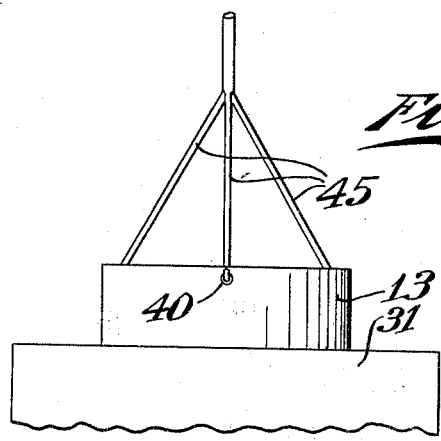
Fig. 10 is a fragmentary view, in elevation, showing the pipe pattern being withdrawn from the mold.
Figure 7:
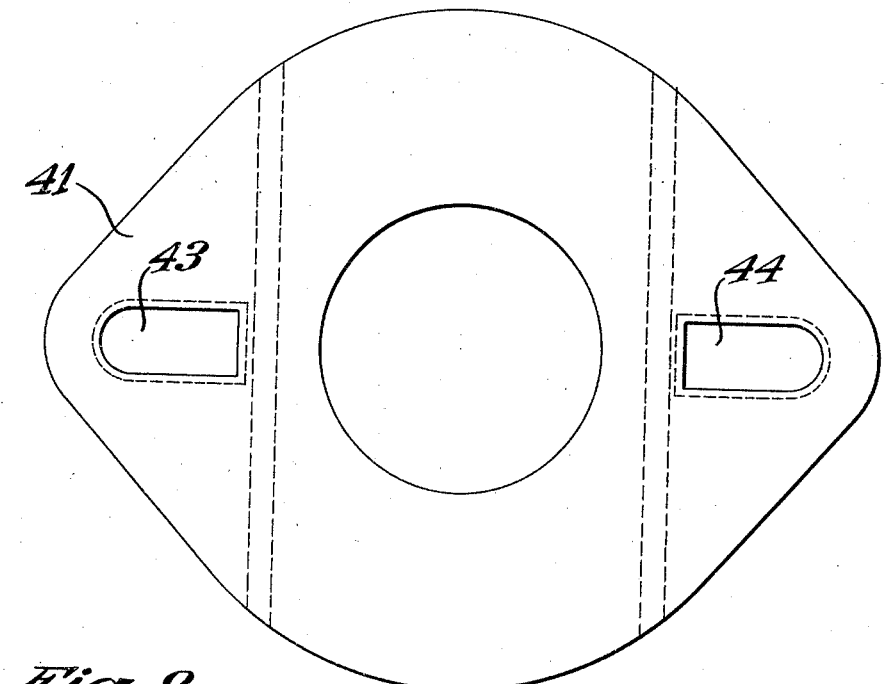
Fig. 7 is a plan view of the spigot chill plate.

When the mold has been packed, it is cleaned off at the top, the spigot and pattern 17 is withdrawn from the mold and the cover 34 removed. On withdrawal of the spigot end pattern the gate runners 27 and 28 leave gates 37 and 38 in the mold through which the molten metal is to run when pouring. A spigot chill plate 41, see Figs. 2, 3 and 7, is next secured to the flask 31, as by C clamps 42. The spigot chill plate 41 is provided with pockets 43 and 44 which come opposite the pouring gates formed by withdrawal of the gate pins 24 and 26, the pockets 43 and 44 being packed with sand before the spigot chill plate 41 is clamped to the flask. When the spigot chill plate 41 is secured to the upper end of the flask 31 as viewed in Fig. 1, the flask is reversed to the position shown in Figs. 2 and 3, leaving the ramming plate on the jolter. In order to reverse the flask, trunnions, such as 46, shown in dotted lines in Fig. 1, are provided on the flask. When the flask 31 is reversed to the position shown in Figs. 2 and 3, the stripping plate 11 is connected to the spigot chill plate 41 by means of rods 51, the latter being, in effect, elongated C clamps, and are provided along their upper ends with screws 52 for firmly joining together the spigot chill plate 41, the stripping plate 11, and the arbor 12. When this has been done, the main patterns 13 is then stripped from the mold, the stripping plate 11 and the bell end pattern 16 serving to strip the main pattern 13 of sand as it is being withdrawn, thus providing smooth surfaces throughout for the finished pipe mold. In order that the main pattern may be stripped by power operated means, such as a crane, suitable holes 40 are provided on the end to which lifting hooks 45 are attached, as shown in Fig. 10. After the main pattern 13 is stripped, the gate pins 24 and 26 are drawn, the connecting rods 51 are removed and also the stripping plate 11 and bell pattern.

Figure 5:
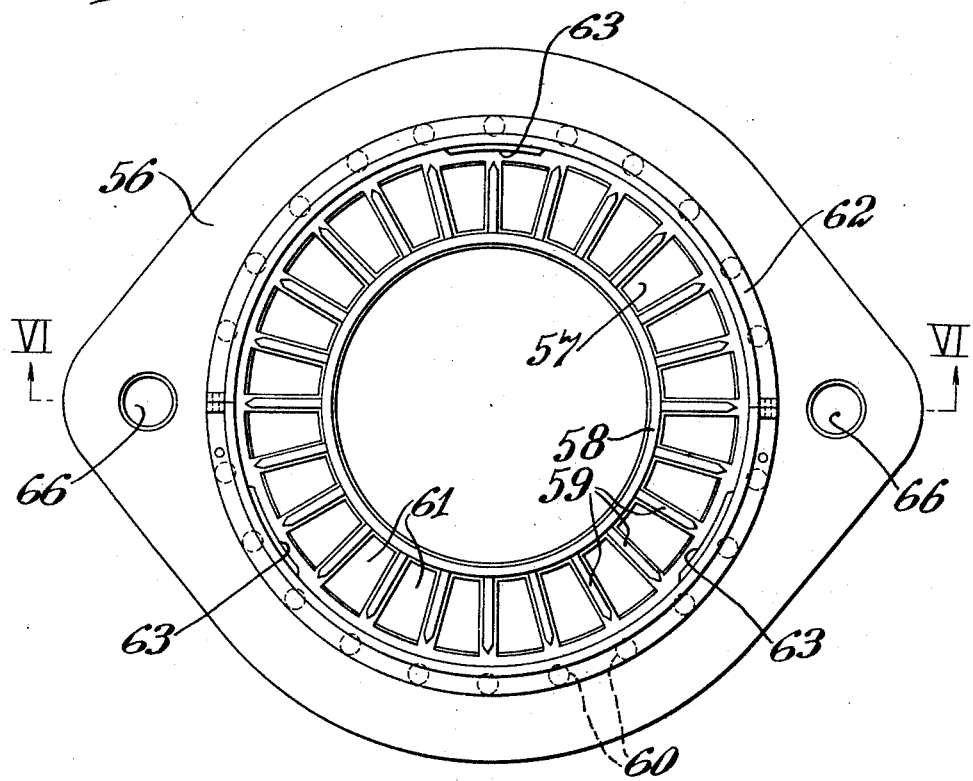
Figs. 5 and 6 show a plan and section respectively of the bell end chill plate and core with the core box in place.
Figure 6:
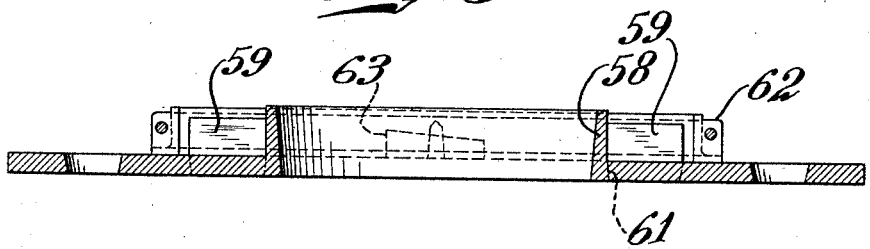

After the main pipe and bell end patterns and stripping plate 11 have been removed from the flask, and the gate pins stripped, a bell end chill plate 56, having a core arbor 57, is prepared. The chill plate 56 is provided with a flange 58 having a plurality of wings or radial fingers 59 extending outwardly therefrom and defining between them a plurality of pockets 61, see Fig. 5. Around the core arbor 57 is then placed a core box 62 having three equally spaced lugs 63 thereon and corresponding in spacing to the lugs 21 of the spigot end of the pipe. The bell end core is then packed with sand and the core box 62 removed, whereupon the core thus formed is placed over the flask 31 in the position shown in Fig. 3. The bell end chill plate 56 is provided with openings 66 which come opposite the gates 25 formed by the gate pins 24 and 26. A pouring box 67 is next prepared, being packed with sand and provided with openings 68 coming opposite the opening 66 in the bell end chill plate and the mold is ready for pouring.

Figure 8:
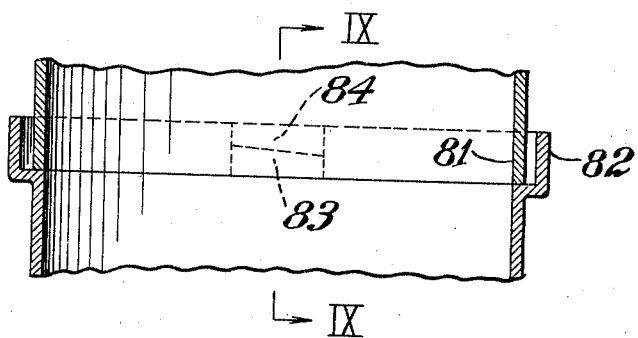
Fig. 8 is a longitudinal sectional view of the finished pipe.
Figure 9:
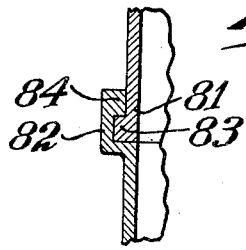
Fig. 9 is a sectional view taken along the line IX—IX of Fig. 8.

It will be seen from the foregoing description that, with the parts assembled and the mold formed in the manner set forth, the molten metal passes downwardly through the gates 25, 37 and 38 and upwardly into the mold formed by the patterns 13, 17 and 16 and the bell end core 57, the gases escaping from the mold by way of openings 60 provided in the bell end chill plate. It will furthermore be seen that the end surfaces at both the bell and spigot ends are formed against a chill plate so as to insure uniform smooth surfaces. The finished pipe may be assembled as shown in Figs. 8 and 9 wherein the spigot end of the pipe is indicated at 81 and the bell end of the pipe at 82. The molding operation provides cooperating lugs 83 and 84 on the spigot and bell ends, respectively, whereby the spigot end may be inserted into the bell end and given a small turn so that the inclined surfaces of the lugs come into engagement and draw the ends of the pipe tightly together.

From the foregoing it will be apparent that I have devised an improved method and apparatus for molding full round pipe whereby such pipe may be economically produced and, when completed, have a smooth surface throughout, with the bell and spigot ends formed against chill plates to provide surfaces of unusual smoothness.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In pipe molding apparatus embodying a sand mold for full round pipe having bell and spigot ends, a main pattern, a bell end pattern surrounding the main pattern, a stripping plate associated with the bell end of the pattern and closely fitting within said pattern, a flask for the mold and having a cover at the spigot end, means provided on the bell end of the pattern for attaching lifting hooks, means for anchoring the stripping plate when withdrawing the pattern, and a flask cover embodying a green sand core arbor for the bell end of the pipe to replace the stripping plate after the pattern is withdrawn.

2. In pipe molding apparatus for full round pipe having bell and spigot ends, a ramming plate, a stripping plate resting on the ramming plate, a core arbor resting on the stripping plate, a pattern having its smaller diameter fitting closely around the stripping plate, a flask surrounding the pattern when the mold is being rammed, a cover for the flask after it is rammed, means provided on the bell end of the pattern for withdrawing it from the mold, means for reversing the flask to withdraw the pattern, means for anchoring the stripping plate when the pattern is being withdrawn, and a flask cover embodying a core arbor and green sand core for the bell end of the pipe to replace the stripping plate when the pattern has been withdrawn.

3. In pipe molding apparatus for full round pipe having bell and spigot ends, a sand mold, a pattern for the mold, and a detachable pattern interlocking with the main pattern and having a plurality of lug patterns thereon to form equidistantly spaced lug molds around the pipe mold, a core fitting within the bell end of the pipe mold and having depression therein to form lug molds corresponding to the lug molds for the spigot ends of the pipe.

4. A method of molding full round cast iron pipe having bell and spigot ends which comprises, assembling a core arbor, pipe and gate patterns and flask on a ramming plate with a stripping plate inserted in the bell end of the pattern, jolt ramming the core and mold simultaneously, mounting a chill plate on the flask at the spigot end of the mold, said chill plate having sand filled pockets aligned with the gates, inverting the flask, removing the ramming plate, anchoring the stripping plate and core arbor to the spigot chill plate, stripping the gate and pipe patterns, removing the stripping plate, mounting a bell chill plate with green sand core attached thereto to replace the stripping plate and complete the bell mold, and pouring the pipe casting through the gates and against the end chill plates.

5. The method of molding as set forth in claim 4 wherein spigot lug molds are formed by a separable spigot end pattern.

6. The method of molding as set forth in claim 4 wherein bell end lug molds are formed on the green sand core on the bell end chill plate.

In testimony whereof I, WALKER REYNOLDS, affix my signature.

WALKER REYNOLDS.